United States Patent [19]

Yip

[11] 4,011,721

[45] Mar. 15, 1977

[54] FLUID CONTROL SYSTEM UTILIZING PRESSURE DROP VALVE

[75] Inventor: James Kwok-Fun Yip, Richfield, Minn.

[73] Assignee: Eaton Corporation, Cleveland, Ohio

[22] Filed: Apr. 14, 1976

[21] Appl. No.: 676,831

[52] U.S. Cl. .................................... 60/445; 60/450
[51] Int. Cl.$^2$ ....................................... F16H 39/46
[58] Field of Search ............ 60/385, 386, 387, 388, 60/445, 450, 494, 465

[56] References Cited

UNITED STATES PATENTS

| 3,908,375 | 9/1975 | Young | 60/445 X |
|---|---|---|---|
| 3,931,711 | 1/1976 | Rau et al. | 60/445 |

*Primary Examiner*—Edgar W. Geoghegan
*Attorney, Agent, or Firm*—Teagno & Toddy

[57] ABSTRACT

A steering control system is disclosed of the type utilizing a variable fluid delivery source, such as a variable delivery pump, providing fluid to a steering cylinder, the flow to the steering cylinder being controlled by a steering control valve. The steering control valve includes a first orifice which is variable between a minimum orifice area permitting a minimum system flow and a maximum orifice area corresponding to a maximum system flow. The variable fluid delivery source is maintained at a generally constant level above the steering load as the system flow varies between the minimum and maximum flow rates. Disposed in series flow relationship between the fluid delivery source and the steering control valve is a second valve including a valve member defining a second variable orifice operable to maintain a relatively constant pressure drop across the second valve as the system flow varies between the minimum and maximum flow rates. The pressure drop across the second valve may be changed by changing or adjusting the biasing force on the valve member and therefore, the same steering control system may be utilized with any of several different pump control (standby) pressures by changing the pressure drop across the second valve, without the need for changing the configuration of the steering control valve and its variable orifice, because the steering control valve will, in each case, be subjected to approximately the same control pressure differential.

9 Claims, 4 Drawing Figures

4,011,721

FLUID CONTROL SYSTEM UTILIZING PRESSURE DROP VALVE

BACKGROUND OF THE DISCLOSURE

The present invention relates to flow control systems, and more particularly, to such systems which are utilized to provide fluid to a vehicle steering cylinder or steering motor.

It will be apparent to those skilled in the art that the present invention may be utilized in any system which controls the flow of fluid from a variable flow and pressure fluid delivery source to a fluid actuated device. However, it is especially adapted for use in the hydraulic control circuit of a vehicular hydrostatic steering system, and will be described in connection therewith.

In a typical hydrostatic steering control system of the type in which the present invention may be used, there is a steering control valve disposed in series flow relationship between the variable fluid source (such as the pump or pump & priority valve), and the steering motor (generally a piston and cylinder). The steering control valve defines a variable orifice which controls both the amount and direction of fluid flow through the steering control valve, and therefore, the rate and direction of actuation of the steering cylinder. The variable orifice in the steering control valve varies from a minimum orifice area to a maximum orifice area in response to the turning of the steering wheel, and as the orifice area increases, the flow through the orifice increases. A particular steering control system is designed to operate at a predetermined rate of fluid flow through the steering control valve, and at a predetermined maximum valve deflection (for example, 10° of rotation of the valving). As is well-known in the art, the predetermined flow rate will occur at the maximum valve deflection only in response to a particular pressure drop across the orifice, and if the pressure drop across the variable orifice is greater than that for which the steering control valve was designed, the predetermined flow rate will occur at a smaller valve deflection (for example, 5° of rotation). Achieving the maximum rate of actuation contemplated by the design of the steering control valve, but at a smaller valve deflection, results in an undesirable increase in the sensitivity of the steering system.

It frequently occurs that the same basic steering control system may be utilized with any one of a number of different pump arrangements, each having a different standby pressure capability, and therefore, each delivering a substantially different fluid pressure to the inlet of the steering control valve. It has been common practice in conventional steering control systems to maintain the desired relationship between valve deflection and the steering control valve and flow rate through the valve by changing the configuration of the variable orifice (i.e., change the area of the orifice at a given valve deflection) to satisfy each of the different pressure drops imposed on the steering control valve. Such modifications of the steering control valve for different fluid sources has added undesirable and otherwise unproductive engineering and manufacturing cost to such steering control systems and restricted the flexibility in use of such systems.

SUMMARY OF THE INVENTION

Accordingly, the present invention overcomes the problems discussed above by providing an improved system for controlling the flow of fluid from a variable fluid delivery source to a fluid actuated device. The system includes a first valve means in fluid communication with the variable fluid delivery source and with the fluid actuated device, the first valve means including a first orifice which is variable between a minimum orifice area corresponding to a minimum system flow rate, and a maximum orifice area corresponding to a maximum system flow rate. A second valve means is disposed in series flow relationship between the variable fluid delivery source and the first variable orifice of the first valve means. The second valve means includes a valve member biased toward a closed position, the valve member defining the second variable orifice operable to maintain a relatively constant pressure drop across the second valve means as the system flow rate varies from the minimum to the maximum.

In accordance with another aspect of the present invention, the biasing force acting on the valve member may be adjusted or changed, to change the pressure drop across the second valve means if the system is used with a different variable fluid delivery source having a different control pressure, while still maintaining the same pressure drop across the first variable orifice, and the same pressure drop across the first valve means.

DESCRIPTION OF THE PREFERRED EMBODIMENT

Figure 1:
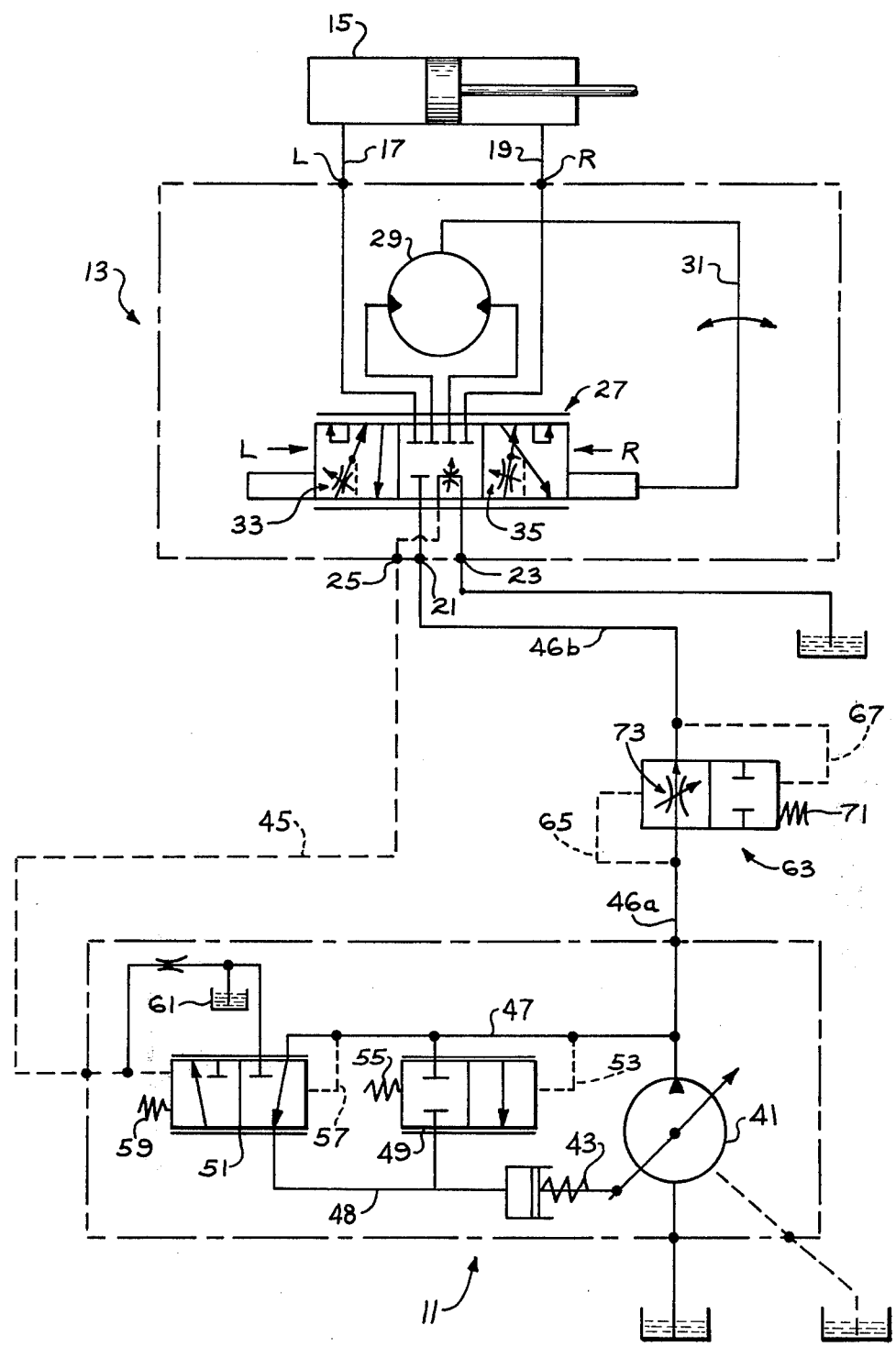
FIG. 1 is a hydraulic schematic showing a preferred embodiment of the steering system of the present invention.

Referring now to the drawings, which are not intended to limit the present invention, FIG. 1 illustrates schematically a hydrostatic power steering system including a flow and pressure compensated pump, generally designated 11, which provides pressurized fluid to a steering control valve, generally designated 13. The steering control valve 13 controls the flow and direction of the pressurized fluid fed to a steering cylinder 15 for steering control of a pair of ground-engaging wheels (not shown).

The steering control valve 13, which is generally of a type well-known in the art, includes a left fluid port L and a right fluid port R which are connected to the opposite ends of steering cylinder 15 by a pair of fluid conduits 17 and 19, respectively. The steering control valve 13 further includes a fluid inlet port 21, a fluid return port 23, and a load sensing port 25. Disposed within the steering control valve 13 is a valving arrangement 27 which is movable from its neutral position shown in FIG. 1 to either a right turn position R or a left turn position L. When the valving arrangement 27 is in either of the turn positions, the pressurized fluid passing through the valving 27 flows through a fluid meter 29, the function of which is to measure the proper amount of fluid to be fed to the appropriate fluid port L or R. As is well-known in the art, the fluid meter 29 is typically connected to the valving 27 by means of a mechanical follow-up 31.

The valving 27 includes, in the left turn position, a variable orifice 33, and in the right turn position, a variable orifice 35. The flow area of each of the variable orifices 33 and 35 is generally proportional to the deflection of the valving 27, such that the deflection of valving 27 (normally achieved by the operator turning the steering wheel), determines both the flow direction and flow rate for fluid entering the steering control valve 13 at the fluid inlet port 21. It will be noted that a pressure signal is sensed immediately downstream from each of the variable orifices 33 and 35 and, for that particular turning position of the valving 27, the downstream pressure signal is fed to the load sensing port 25 for use as will be described subsequently.

The flow and pressure-compensated pump system 11 includes a variable displacement pump 41, the displacement of which is varied by means of a stroke control mechanism 43, as is well-known in the art. The pump system 11 is connected to the load sensing port 25 by means of a fluid conduit 45 in order to utilize the pressure signal downstream from either of the variable orifices 33 or 35 as an input to the stroke control mechanism 43 to maintain the output pressure of variable delivery pump 41 above the load pressure by a generally constant amount. The output flow from the variable delivery pump 41 is communicated to the fluid inlet port 21 by means of fluid conduits 46a and 46b. In fluid communication with the fluid conduit 46a is a pressure line 47 with a pressure compensator 49 and a flow compensator 51 connected in parallel between the pressure line 47 and a line 48 feeding the stroke control mechanism 43. When there is sufficient pressure in pilot line 53 to overcome the biasing force of a spring 55, the pressure compensator valve 49 is shifted to a position which permits the passage of fluid from the pressure line 47 to the stroke control mechanism 43.

Similarly, when there is sufficient pressure in pilot line 57 to overcome the combined biasing effect of a spring 59 and the load sensing pressure in fluid conduit 45, the flow control valve 51 is shifted to the position shown in FIG. 1 to permit the passage of fluid from the pressure line 47 to the stroke control mechanism 43. Otherwise, the flow control valve 51 is normally shifted to a position which permits the passage of fluid from the stroke control mechanism 43 to the reservoir 61. Thus, displacement of the variable displacement pump 41 is controlled in response to both the pump output pressure in fluid conduit 46a and the load sensing pressure in fluid conduit 45.

Disposed in series flow relationship between fluid conduits 46a and 46b, and between the variable displacement pump 41 and the fluid inlet port 21, is a pressure drop valve 63. A pilot line 65 communicates fluid pressure upstream from the valve 63 while a pilot line 67 communicates fluid pressure downstream from the valve 63, and a spring 71 biases the valve 63 towards its normally closed position. When the upstream fluid pressure in pilot line 65 is sufficient to overcome the combined biasing forces of the spring 71 and the downstream fluid pressure in pilot line 67, the valve 63 is moved to its open position (as shown in FIG. 1). In the open position, the valve 63 defines a variable orifice 73, and when the flow area of the orifice 73 increases, an increased system flow passes through the fluid conduits 46a and 46b. However, as the flow area of the variable orifice 73 and the system flow vary between a minimum and a maximum, the pressure drop across the orifice 73 and the valve 63 remains relatively constant.

Figure 2:
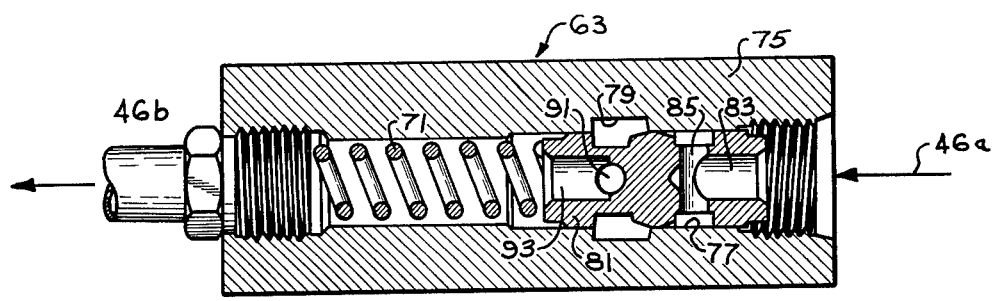
FIG. 2 is a partly schematic cross section of a pressure drop valve of the type which may be used in the system of the present invention.
Figure 3:
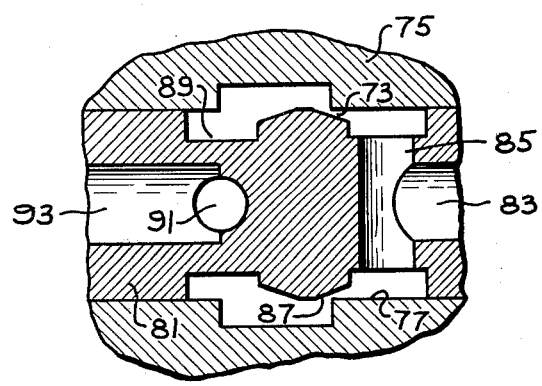
FIGS. 3 and 4 are enlarged, fragmentary views, similar to FIG. 2, illustrating different operative conditions of the valve of FIG. 2.
Figure 4:
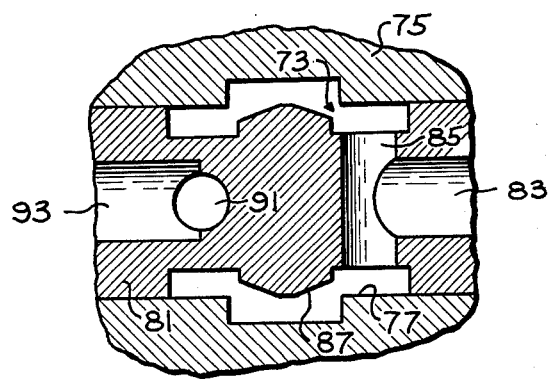

Referring now to FIGS. 2, 3, and 4, in conjunction with FIG. 1, it may be seen that the pressure drop valve 63 includes a valve housing 75 which defines a valve bore 77 and an enlarged bore portion 79. Disposed within the bore 77 is a valve member 81 which defines an axial inlet passage 83 communicating with a radial bore 85. When the inlet pressure in fluid conduit 46a is insufficient to overcome the biasing force of spring 71, the valve member 81 is in the closed position shown in FIG. 2. However, when the inlet pressure is sufficient, the valve member is biased to the open position shown in FIG. 3, defining the variable orifice 73 between the edge of the valve bore 77 and a variable metering land 87 formed on the valve member 81. Flow passing through the variable orifice 73 enters annular groove 89, then a radial bore 91, and finally, out through an axial passage 93 into fluid conduit 46b.

In discussing the fluid control system of the present invention, any line losses (i.e., pressure drops) occurring in fluid conduits 46a and 46b will be treated as being negligible and will not be considered. It will be appreciated that in the subsequent discussion, the pressure levels referred to are by way of example only and neither the pressure levels nor the relationships therebetween are intended to limit the present invention. It will be assumed by way of example that the valving 27 and the variable orifices 33 and 35 are configured such that the maximum desired system flow occurs at the maximum desired deflection of the valving 27 in response to a pressure drop of 65 psi across the variable orifice (either 33 or 35). Therefore, the fluid pressure at the inlet port 21 must be approximately 65 psi above the steering load pressure. If the system of the present invention is to be used with a pump system in which the variable displacement pump 41 is capable of generating a standby pressure of approximately 200 psi, it will be necessary to select the spring 71 of the present drop valve 63 such that a pressure drop of approximately 135 psi will occur across the pressure drop valve 63 as the system flow rate varies from a minimum (corresponding to minimum valve deflection) to a maximum (corresponding to maximum valve deflection).

If the same steering control system is then to be used with a different pump system in which the variable displacement pump generates a standby pressure of 300 psi, the only change necessary in the system is the replacement of the spring 71 with a different spring whereby a relatively constant pressure drop of 235 psi is maintained across the pressure drop valve 63 as the system flow rate varies from the minimum flow to the maximum flow. It will be understood by those skilled in the art that a valve arrangement such as the pressure drop valve 63 of the present invention will not maintain the pressure drop thereacross exactly constant throughout the flow range, but within the scope of the present invention it is necessary only that the pressure drop be held relatively constant as the flow varies from a minimum to a maximum, rather than varying substantially as is the case with a typical relief valve or ball check valve. It should also be noted that pressure drop valve 63 serves to minimize the possibility of back flow in fluid conduits 46a and 46b (and therefore, in the steering control valve 13) as well as steering wheel "kick."

I claim:

1. A system for controlling the flow of fluid from a variable fluid delivery source to a fluid actuated device, said system comprising:
   a. first valve means in fluid communication with the variable fluid delivery source and with the fluid actuated device, said first valve means including a first orifice variable between a minimum orifice area corresponding to a minimum system flow rate and a maximum orifice area corresponding to a maximum system flow rate;
   b. means for maintaining the variable fluid delivery source output pressure at a generally constant level above the load on the fluid actuated device as said first orifice varies from said minimum orifice area to said maximum orifice area;
   c. second valve means being in series flow relationship between the variable fluid delivery source and said first variable orifice of said first valve means;
   d. said second valve means including a valve member biased towards a closed position in the absence of at least a predetermined minimum fluid pressure, said valve member defining a second variable orifice operable to maintain a relatively constant pressure drop across said second valve means as said system flow rate varies from said minimum to said maximum.

2. A system as claimed in claim 1 wherein said first valve means is a steering control valve and the fluid actuated device is a fluid steering motor for controlling a pair of ground-engaging wheels.

3. A system as claimed in claim 2 wherein said first variable orifice is operable to determine the rate of operation of said fluid steering motor.

4. A system as claimed in claim 1 wherein said second valve means comprises a valve body defining an inlet port in fluid communication with the variable fluid delivery source, an outlet port in fluid communication with said first valve means, and a valve bore communicating between said inlet port and said outlet port, said valve member being biased toward said closed position by fluid pressure at said outlet port and being biased toward an open position by fluid pressure at said inlet port.

5. A system as claimed in claim 4 wherein said valve bore defines a metering edge, said valve member defines a variable metering land, and said metering edge and said metering land cooperate to define said second variable orifice.

6. A system for controlling the flow of fluid from a variable fluid delivery source to a fluid actuated device, said system comprising:
   a. means for maintaining the variable fluid delivery source output pressure $P_1$ at a generally constant level above the load on the fluid actuated device as the system flow varies between a minimum flow rate and a maximum flow rate;
   b. first valve means disposed in series flow relationship between the variable fluid delivery source and the fluid actuated device, said first valve means including a first orifice variable between a minimum orifice area and a maximum orifice area to establish the system flow rate;
   c. second valve means in series flow relationship between the variable fluid delivery source and said first valve means and having an inlet port, at an inlet pressure $P_2$, in fluid communication with the variable fluid delivery source and an outlet port, at an oulet pressure $P_3$, in fluid communication with said first variable orifice of said first valve means;
   d. said first valve means receiving fluid at said first variable orifice at a pressure $P_4$ and passing fluid downstream of said first variable orifice at a pressure $P_5$, pressure drop $P_1$-$P_2$ being generally constant and pressure drop $P_3$-$P_4$ being generally constant as said system flow varies between said minimum flow rate and said maximum flow rate;
   e. said second valve means defining a second variable orifice, outlet pressure $P_3$ being substantially less than inlet pressure $P_2$, said second variable orifice being operable to maintain pressure drop $P_2$-$P_3$ relatively constant as the system flow varies between said minimum flow rate and said maximum flow rate to maintain the pressure drop $P_4$-$P_5$ relatively constant, as said first orifice varies between said minimum orifice area and said maximum orifice area.

7. A system as claimed in claim 6 wherein said first valve means is a steering control valve and the fluid actuated device is a fluid steering motor for controlling a pair of ground-engaging wheels.

8. A system as claimed in claim 6 wherein said second valve means comprises a valve body defining a valve bore communicating between said inlet port and said outlet port, and a valve member biased toward said inlet port by a spring member and the fluid pressure at said outlet port, and biased toward said outlet port by fluid pressure at said inlet port.

9. A system for controlling the flow of fluid from either a first variable fluid delivery source having a first output pressure $P_a$ or a second variable fluid delivery source having a second output pressure $P_b$ to a fluid actuated device, said system comprising:
   a. first valve means disposed in series flow relationship between the variable fluid delivery source in use and the fluid actuated device, said first valve means including a first orifice variable between a minimum orifice area and a maximum orifice area, said first valve means and said first orifice being configured to operate with a predetermined pressure drop $P_3$-$P_4$ across said first orifice;
   b. means for maintaining the variable fluid delivery source output pressure at a generally constant level above $P_4$ as the system flow varies between a minimum flow rate and a maximum flow rate;
   c. second valve means having an inlet port and being in series flow relationship between the variable fluid delivery source and said first valve means;
   d. said second valve means including a valve member selectively biased by a first biasing means when fluid is received from the first variable fluid delivery source and a second biasing means when fluid is received from the second variable fluid delivery source;
   e. said first biasing means being operable to maintain a pressure drop across said second valve means approximately equal to $P_a$-$P_3$ as said system flow varies between said minimum flow rate and said maximum flow rate; and
   f. said second biasing means being operable to maintain a pressure drop across said second valve means approximately equal to $P_b$-$P_3$ as said system flow varies between said minimum flow rate and said maximum flow rate.

* * * * *

UNITED STATES PATENT AND TRADEMARK OFFICE
CERTIFICATE OF CORRECTION

PATENT NO. : 4,011,721
DATED : March 15, 1977
INVENTOR(S) : James Kwok-Fun Yip

It is certified that error appears in the above-identified patent and that said Letters Patent are hereby corrected as shown below:

Col. 1, line 7:     Insert "flow" after "fluid".

Col. 4, line 40:    Insert "pressure" rather than "present".

Signed and Sealed this fifth Day of July 1977

[SEAL]

Attest:

RUTH C. MASON
*Attesting Officer*

C. MARSHALL DANN
*Commissioner of Patents and Trademarks*